United States Patent Office 3,539,601
Patented Nov. 10, 1970

3,539,601
FATTY AMIDO AMINES
Morton Lewis, Elmhurst, Ill., assignor to Swift & Company, Chicago, Ill., a corporation of Delaware
No Drawing. Filed July 12, 1967, Ser. No. 652,736
Int. Cl. C07f 9/10
U.S. Cl. 260—403    5 Claims

ABSTRACT OF THE DISCLOSURE

Halogenated fatty amido amines are produced by a novel process of reacting an unsaturated triglyceride with a primary-tertiary amine at elevated temperatures followed by halogenation.

---

This invention relates to the production of novel organic compounds, and relates more particularly to halogenated fatty amido amines and their quaternary salts. The novel compositions are suitable for various uses such as surface active agents, germicides, fungicides, flame retardants, dye absorption enhancers, etc.

Generally speaking, most amido amines are synthesized from fatty acids, their methyl esters or acid chlorides and require long reaction times in order to produce the product in a reasonable yield. Usually the diamine must be used in a large excess and the product is often complicated by the formation of diamides or imidazoles. Accordingly, a process capable of producing fatty amido amines in a relatively short time and using substantially stoichiometric amounts of polyamine and without forming imidazoles would be of considerable value.

Further, in regard to the halogenation of fatty materials, the unsaturated material is contacted with halogen at a low temperature. Improvements on this well-known procedure have been suggested and among these improvements are the use of water as a carrier for the halogenation reaction, the use of methanol to facilitate the addition of halogen to the unsaturated material and permit the production of relatively pure halogenated products, and also the use of sulphur dioxide to insure intimate contact of the halogen with the material undergoing halogenation. Specifically, bromination in aqueous solution offers the advantage of a lighter colored product as well as ease and safety of handling.

While each of the above mentioned procedures has provided an improvement in the halogenation process, each has been found to have attendant shortcomings. Various operating difficulties arise because of several reasons, one of which is that the fatty material is not water soluble and hence two or more phases exist. Accordingly, a process to convert the water-insoluble fatty amido amine into a water soluble substance prior to halogenation would be advantageous.

Further, in preparing flame retardant compositions, it is the usual practice to employ particular metal salts or oxides with a halogenated substance. The particular metals are selected from the group comprising antimony, arsenic, bismuth and thin, which, in general, are quite toxic. In addition to the toxicity of these metals, they sometimes create other problems such as non-smoothness of a particular suspension or dispersion and hence it is oftentimes desirable to eliminate the metal salt or oxide entirely. In such situations, it is desirable to have both halogen and phosphorus atoms present in the same molecule.

Accordingly, it is an object of this invention to produce novel fatty materials containing both halogen and phosphorous which are capable of functioning as flame retardants either in the presence or absence of certain metal salts or oxides.

Another object of this invention is to provide a method of synthesizing fatty amido amines using essentially stoichiometric amounts of reactants while producing a reasonable yield of final product in a relatively short period of time.

Additional objects, if not specifically set forth herein, will be readily apparent to those skilled in the art from the detailed description of the invention which follows.

Generally, the novel compositions of this invention are halogenated fatty amido amines and their quaternary salts. The compositions can be readily prepared by reacting a primary-tertiary diamine with a triglyceride to form the fatty amido amine. In the preferred embodiment of the invention, the fatty amido amine is then quaternized with an alkyl, aryl or alkyl aryl phosphate. The quaternary amino amide formed this way is now water soluble and can be halogenated in aqueous solution. Halogenation, and particularly bromination, in aqueous solution offers the advantage of a lighter colored product as well as ease and safety of handling. Yet it is possible to first halogenate the fatty amido amine and convert it to its quaternary ammonium salt by subsequent reaction with the phosphate. The compositions of this invention can be represented as follows:

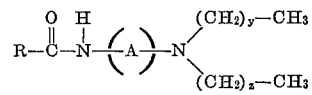

and

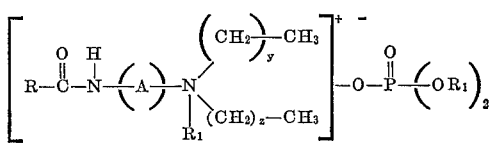

wherein A is an alkylene radical of from 1 to 8 carbon atoms or divalent aryl such as phenylene or alkyl aryl, y and z are integers of 0 to 7, R is a halogenated alkyl radical of about 8 to about 30 carbons and $R_1$ is an alkyl, alkenyl alkynyl, aryl, alkyl aryl, or aryl alkyl radical of less than 20 carbon atoms.

A particular advantage of a specific embodiment of this invention is the fact that the amidification reaction can be conducted in about ¼ to ½ of the time normally required when amidifying lower alkyl esters. Also, in prior art procedures, a relatively large excess of amine is required when amidifying lower alkyl esters. In the instant invention, only three equivalents of amine to one equivalent of the triglyceride need be utilized to form essentially three equivalents of fatty amido amine along with one equivalent of glycerine. This is nearly a stoichiometric amount and eliminates the expense of the loss of the excess amine used in the prior art procedures or the cost of the recovery of said amine.

The amidification reaction is conducted at elevated temperatures (170-210° C.) for about three or four hours. This should be contrasted with over 16 hours required when the corresponding methyl estes are used. In forming the fatty amido amine, the triglyceride and polyamine are intimately mixed and stirred while being slowly heated to about 170 to 210° C. Usually it is preferred to conduct the reaction at about 180 to 190° C. for 4 hours. After the product cools, it can be diluted with ether and poured into a separatory funnel. After removal of the glycerine layer, the ether layer is washed with water and once or twice with a saturated sodium chloride solution. The ether solution can then be dried, say over sodium sulfate, and then removed by evaporation under reduced pressure.

In regard to the triglyceride used to react with the polyamine, one may select either synthetic or naturally-occurring glycerides having about 8 to 30 carbon atoms per acyl radical. Suitable naturally-occurring oils which may be used in practicing the invention include animal, vegetable and marine triglycerides preferably containing not more tha about 20% saturated fatty acids. These naturally occurring oils should have a degree of unsaturation represented by an iodine value of at least about 150 and preferably between about 170 to about 210. The unsaturated oils may contain hydroxyl groups such as found in castor oil, as well as other non-interfering substitutents. Examples of suitable reactants include soybean oil, linseed oil, corn oil, safflower oil, perilla oil, cottonseed oil, sesame seed oil, rapeseed oil, peanut oil, castor oil, fish oils such as menhaden oil, herring oil, cod liver oil, sardine oil, as well as sperm oil.

The polynitrogen reactant may be represented by the following formula:

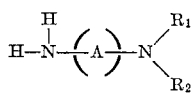

wherein A is an alkylene radical of from 1 to 8 carbons or divalent alkyl aryl or aryl, such as phenylene, of about 6 to 12 carbons and $R_1$ and $R_2$ are straight or branch chain alkyl, alkenyl, or substituted alkyl groups including halo alkyl of about 1 to 8 carbon atoms. Representative examples of suitable amines include dimethylaminopropylamine, diethylaminopropylamine, dipropylaminopropylamine, dibutylaminopropylamine, diamylaminopropylamine, dihexylaminopropylamine, dioctylaminopropylamine, methylethylaminopropylamine, ethylbutylaminopropylamine, ethyloctylaminopropylamine, dimethylaminoethylamine, diethylaminoethylamine, dipropylaminoethylamine, dibutylaminoethylamine, diethylaminobutylamine, dimethylaminopentylamnie, diethylaminohexylamine, dibutylaminoheptylamine, dimethylaminooctylamine, isopropylaminoethylamine, methylbutylaminobutylamine, ethypropylaminohexylamine, ethylpropylaminooctylamine, etc. Corresponding unsaturated derivatives may be used and include such materials as dipropyleneaminopropylamine, dibutyleneaminobutylamine, methylpropyleneaminopropylamine, etc. Halogenated amines include bis(2-chloroethyl)-aminopropylamine, bis(2-chloroethyl)aminobutylamine, etc.

In the preferred embodiment of the invention, the fatty amido amine is quaternized prior to halogenation by reaction with a phosphate represented by the formula:

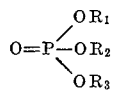

wherein $R_1$, $R_2$ and $R_3$ are alkyl, alkenyl, halo alkyl radicals of about 1 to 8 carbons, aryl radicals of less than 18 carbons, and $R_1$ and $R_2$ can be combined to represent cyclic structures.

Representative examples include trimethylphosphate, triethylphosphate, tripropylphosphate, triisopropylphosphate, tributylphosphate, tripentylphosphate, trihexylposphate, tri(2-ethylhexyl)phosphate, triheptylphosphate, trioctylphosphate, triphenylphosphate, triallyphosphate, trioleylphosphate, tribenzylphosphate, tris-2-chloroethylphosphate, tris-dichloropropylphosphate, tris-2-bromoethylphosphate, tris-dibromopropylphosphate, tris-9,10-dichlorooctadecylphosphate, and tris-9,10-dibromooctadecylphosphate.

In forming the quaternary, the fatty amido amine is intimately mixed with the particular phosphate and heated to a temperature of between about 200 and 240° C. for about five hours. The quaternary amino amides formed in this way are now water soluble and can be halogenated in aqueous solutions.

Of particular value are the compositions containing the middle halogens, i.e., bromine, chlorine or iodine. The addition of the halogen should be conducted at rather low temperatures to avoid decomposition and for safety precautions. Thus, during addition of the halogen, the reaction mixture temperature should be kept below 20° C. After the addition of the halogen is complete, the reaction mixture may be warmed to a somewhat higher temperature, preferably not exceeding about 60° C. to insure completion of the halogenation.

In many cases, it may be found best to maintain the reaction at low temperatures, i.e., in the ranges of about −10° C. to about 20° C. during the addition of the halogen and then warm the mixture to a higher temperature to insure complete reaction. During this time, the halogen is added through a dropping funnel at such a rate that there is no build-up of halogen in the reaction vessel.

Halogenation of the olefinic double bond results in halogen atoms on adjacent carbons. Since the halogen reacts substantially only with unsaturated bonds, it is generally only necessary to add a stoichiometric amount of halogen if one desires to obtain an essentially pure product. This can be determined by determining the iodine value of the fatty amido quaternary amine phosphate just prior to halogenation. In many cases, it has been found that little or no side reactions occur so that a sufficiently pure product will be obtained by simply evaporating off the aqueous solvent from the final reaction mixture, preferably using subatmospheric pressure as necessary to avoid thermal decomposition of the product. The addition of bromine to these unsaturated compositions results in a marked increase in specific gravity thereof, the amount of the increase being determined by the degree of unsaturation of the material undergoing bromination. High specific gravity compounds, such as the brominated derivatives, may be used as flame retardants, germicides, etc. When used as flame retardants, the halogenated fatty amido amine quaternary will contain about 20% to 50% halogen. The following examples illustrate the invention. Examples are in no way to be considered limitative on the spirit and scope of the invention inasmuch as the invention is defined by the appended claims.

EXAMPLE I

Into a 1-liter, 3-neck round bottom flask equipped with a reflux condenser, motor-driven stirrer, and thermometer was weighted 370 grams (0.424 mole) safflower oil and 130 grams (1.27 mole or 3 equivalents per mole of oil) dimethylaminopropylamine. The reaction mixture was slowly heated with a Glas-Col heating mantle to a temperature of about 185° C. over a 3½ hour period. The heating was then stopped and the reaction mixture allowed to cool. The product was diluted with diethylether and poured into a separatory funnel. The glycerine layer was removed and the ether layer was washed once with water and twice with saturated sodium chloride solution. The ether solution was then dried over sodium sulfate and the ether removed (after filtering away from the drying agent) by evaporation under reduced pressure. The resulting dark amber oil weighed approximately 435 grams and was the fatty amidopropyldimethylamine. All 435 grams (1.2 mole) of the fatty amidopropyldimethylamine was poured into a 1-liter, 3-neck flask equipped as above and 218 grams (1.2 mole) of triethylphosphate was added. The reaction system was heated to 220° C. and held at about this temperature for 5 hours. At this point, the product is water soluble and surface active and is in the form of the fatty amidopropylquaternaryaminephosphate. Into a 500 ml., 3-neck round bottom flask equipped with a motor-driven stirrer, thermometer, and dropping funnel was weighed 181.7 grams (.33 mole) of the quaternary phosphate. The quaternary phosphate was dissolved in 150 grams of water and 50 grams of methyl alcohol. The bromine (88.9 grams) was then added to the dropping funnel at such a rate that there was no build-up of the bromine in the reaction vessel. During the entire addition of bromine, the temperature of the reaction media was maintained at between 12 and 16° C. by means of external ice bath. After all the bromine was added, the reaction vessel was heated with a Glas-Col heating mantle and the temperature raised to 60° C. for 1 hour. Air was blown through the hot solution for 2 hours to remove excess bromine from the product. This also removed some of the water and alcohol solvent and it was necessary to redilute the solution and determine the solids content experimentally. The final product was a white-yellow solution that tended to seed out solid product when cooled or allowed to stand at a cool temperature for several days. The halogenated fatty amidopropylquaternaryamine made from safflower oil, dimethylaminopropylamine, triethylphosphate and bromine had the following properties.

Nature: Water soluble cationic surfactant containing organic bromine and phosphorus.

Analysis

Bromine content—30.0% of solids
Phosphorus content—3.85% of solids
Solids—63.4% in aqueous methanol
Appearance: Amber liquid (warm to dissolve if precipitate forms).

SURFACTANT PROPERTIES

| Draves wetting time (25° C.) | | Ross miles pour form test (25° C.) | | |
|---|---|---|---|---|
| Conc., percent | Time, sec. | Mm. foam, percent | (Immediate) | (After 5 min.) |
| 1 | 16 | 1 | 180 | 25 |
| 0.5 | 22 | 0.25 | 170 | 150 |
| 0.375 | 41 | 0.1 | 145 | 135 |
| 0.250 | 200 | 0.01 | 85 | 85 |

| | Surface tension (25° C.) | Interfacial tension (25° C.) | |
|---|---|---|---|
| Conc., percent | Time, sec. | Benzene/ $H_2O$ | Hexane/ water |
| 0.1 | 34.7 | 0.1 | 0.1 |
| 0.01 | 39.0 | 0.1 | 0.1 |
| 0.001 | 49.2 | 10.7 | 13.0 |
| 0.0001 | 58.8 | 26.7 | 32.3 |

NOTE.—Substantive to cotton (does not rinse off after dipping in 0.1% solution), appears also to enhance dye absorption (modified Wickup Test).

EXAMPLE II

Into a 1-l., 3-neck round bottom flask equipped with a reflux condenser, motor driven stirrer, and thermometer, was weighed 370 g. (0.424 mole) soybean oil and 165 g. diethylaminopropylamine (1.27 mole or 3 equivalents per mole of oil). The reaction mixture was slowly heated with a Glas-Col heating mantle to a temperature of about 185° C. over a 3½ hour period. The heating was then stopped and the reaction mixture allowed to cool. The product was diluted with diethylether and poured into a separatory funnel. The glycerine layer was removed and the ether layer was washed once with water and twice with saturated sodium chloride solution. The ether solution was then dried over sodium sulfate and the ether removed (after filtering away from the drying agent) by evaporation under reduced pressure. The resulting dark amber oil weighed approximately 465 g. (1.2 mole) and it was the fatty amidopropyldiethylamine. All 465 g. of the fatty amidopropyldiethylamine was poured into a 1-l., 3-neck flask equipped as above and 168 g. trimethylphosphate (1.2 mole) was added. The reaction system was heated to 220° C. and held at about this temperature for five hours. At this point the product is water soluble and surface active and is in the form of the fatty amidopropylquaternaryaminephosphate. The product was essentially completely brominated in a manner similar to the procedure set forth in Example I.

EXAMPLE III

Into a 1-l., 3-neck round bottom flask equipped with a reflux condenser, motor driven stirrer, and thermometer, was weighed 370 g. (0.424 mole) corn oil, and 235 g. (1.27 mole or 3 equivalents per mole of oil) dibutylaminopropylamine. The reaction mixture was slowly heated with a Glas-Col heating mantle to a temperature of about 185° C. over a 4 hours period. The heating was then stopped and the reaction mixture allowed to cool. The reaction product was worked up as described in Example II above. The resulting product contained 535 g. (1.2 mole) and it was poured into a 1-l., 3-neck flask equipped as above and 218 g. triethylphosphate (1.2 mole) was added. The reaction system was heated to 220° C. and held at this temperature for five hours. At this point the product is water soluble and surface active and is in the form of a corn oil fatty aminopropylquaternaryamine phosphate. The product was readily brominated in a manner similar to the procedure set forth in Example I.

EXAMPLE IV

Into a 1-l, 3-neck round bottom flask equipped with a reflux condenser, motor driven stirrer, and thermometer, was weighed at 370 g. (0.424 mole) linseed oil, and 146 g. N,N-di-ethylethylenediamine (1.27 mole). The reaction mixture was slowly heated with a Glas-Col heating mantle to a temperature of about 185° C over a 3½ hour period. The heating was then stopped and the reaction mixture allowed to cool. The reaction product was worked up as described in Example II above. The product contained 455 g. (1.2 mole) was poured into a 1-l., 3-neck flask equipped as above and 218 g. triethylphosphate (1.2 mole) was added. The reaction system was heated to 220° C. and held at about this temperature for five hours. At this point, the product is in the form of the linseed fatty amidopropylquaternaryaminephosphate and was readily brominated.

EXAMPLE V

Into a 1-l., 3-neck round bottom flask equipped with a reflux condenser, motor driven stirrer and thermometer was weighed 370 g. (0.405 mole) castor oil, and 155 g. diethylaminopropylamine (1.2 mole). The reaction was run and the product worked up as described in Example II above. The product 445 g. (1.1 mole) was reacted with 154 g. trimethylphosphate (1.1 mole) at 220° C. for about 5 hours. The product of this reaction was the castor fatty amidopropylquaternaryaminephosphate and was then brominated.

EXAMPLE VI

A properly equipped 1-l., 3-neck round bottom flask was charged with 370 g. (0.424 mole) soybean oil and 199 g. 2-amino-5-diethylaminopentane (1.27 mole) and reacted as described in Example II above. The product, worked up as described previously, consisted of 505 g. (1.2 mole) and was reacted with 520 g. tri-2-ethylhexylphosphate (1.2 mole) at 220° C. for about 5 hours. The resulting product was the desired fatty amidoquaternaryaminephosphate and was subsequently chlorinated.

EXAMPLE VII

Into a properly equipped vessel was charged 370 g. safflower oil (0.424 mole) and 209 g. N,N-diethyl-p-phenylenediamine (1.27 mole) the reaction was run and the product worked up as described in Example II above. The product 510 g. (1.2 mole) was reacted with 392 g. triphenylphosphate in the manner described previously to give the desired fatty amidoquaternaryaminephosphate. The product was readily brominated in a manner similar to that set forth in Example I.

EXAMPLE VIII

Into a properly equipped reaction vessel was charged 370 g. (0.424 mole) linseed oil and 111 g. unsyn. dimethylethylenediamine (1.27 mole). The reaction was run and the product worked up as described in Example II above. The product 420 g. (1.2 mole) was then reacted with 262 g. triallylphosphate (1.2 mole) in the manner already described to give the desired fatty amidoquaternaryaminephosphate. The product was then brominated in a manner similar to that set forth above.

Obviously many modifications and variations of the invention as hereinbefore set forth may be made without departing from the spirit and scope thereof, and, therefore, only those limitations should be imposed as are indicated in the appended claims.

I claim:
1. A novel composition of matter represented by the formula:

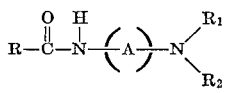

and

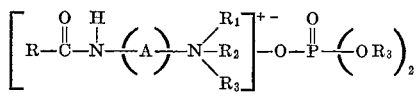

wherein R is a halogenated aliphatic radical of about 8 to 30 carbons, A is an alkylene radical of from 1 to 8 carbon atoms or a divalent alkyl aryl or aryl radical of about 6 to 12 carbon atoms, $R_1$ and $R_2$ may be the same or different and are alkyl, alkenyl, or halo alkyl radicals of 1 to 8 carbons, and $R_3$ is an alkyl, aryl, alkyl aryl, or aryl alkyl radical of less than about 20 carbon atoms.

2. A composition of claim 1 wherein R is a brominated aliphatic radical of 12 to 22 carbon atoms.

3. The composition of claim 1 wherein $R_1$ and $R_2$ are alkyl radicals and A is a propylene radical.

4. The composition of claim 1 wherein R is a brominated aliphatic radical with 12 to 22 carbon atoms, A is a propylene radical and $R_1$ and $R_2$ are lower alkyl radicals.

5. The composition of claim 1 wherein R is a halogenated straight chain aliphatic radical derived from a member selected from the group consisting of soybean oil, linseed oil, safflower oil, perilla oil, cottonseed oil, sesame seed oil, rapeseed oil, castor oil, corn oil, menhaden oil, herring oil, cod liver oil, sardine oil and sperm oil.

References Cited
UNITED STATES PATENTS 2,987,527   6/1961   Sincroft et al. _____ 260—403
2,329,406   9/1943   Mauersberger _____ 260—403

ELBERT L. ROBERTS, Primary Examiner